United States Patent [19]

MacLaughlin et al.

[11] Patent Number: 4,462,849
[45] Date of Patent: Jul. 31, 1984

[54] METHOD OF OSCILLATORY BONDING

[75] Inventors: Donald MacLaughlin, Midland, Mich.; Vincent Fortuna, Huntington Beach, Calif.

[73] Assignee: Cosden Technology, Inc., Dallas, Tex.

[21] Appl. No.: 371,363

[22] Filed: Apr. 23, 1982

[51] Int. Cl.³ .............................................. B29C 27/08
[52] U.S. Cl. ..................................... 156/73.5; 156/69; 156/293; 156/294; 156/423; 228/112; 264/68
[58] Field of Search ...................... 156/69, 73.1, 73.5, 156/73.6, 228, 293, 294, 304.1, 304.5, 423, 580, 580.1, 580.2; 264/23, 68; 425/174.2, DIG. 22; 228/1 R, 1 B, 2, 110, 112

[56] References Cited

U.S. PATENT DOCUMENTS

| Re. 29,448 | 10/1977 | Brown et al. | 264/68 |
| 3,463,843 | 8/1969 | Taylor et al. | 156/73.5 |
| 3,494,817 | 2/1970 | Whitecar | 156/567 |
| 3,701,708 | 10/1972 | Brown et al. | 156/73.5 |
| 3,860,468 | 1/1975 | Scherer | 156/73.5 |
| 3,944,261 | 3/1976 | Reed et al. | 156/73.1 |
| 4,140,058 | 2/1979 | Ballreich et al. | 156/73.1 |

Primary Examiner—Michael G. Wityshyn
Attorney, Agent, or Firm—Michael J. Caddell; M. Norwood Cheairs

[57] ABSTRACT

Methods and apparatus are disclosed for the bonding together of two similarly shaped articles of similar thermoplastic material utilizing oscillatory motion between the two articles to generate frictional heat therein sufficient to form an hermetic seal therebetween.

12 Claims, 8 Drawing Figures

METHOD OF OSCILLATORY BONDING

BACKGROUND OF THE INVENTION

The present invention relates generally to the bonding together of two similarly shaped portions of thermoplastic articles and more particularly involves friction welding of upper and lower container sections to provide a single hermetically welded container.

The prior art discloses a method of welding container sections together to form a single container, which method is directed to cylindrically shaped thermoplastic containers which are rotated at high speeds against each other to generate by friction the heat necessary to bond the two sections together. This prior art method is commonly referred to as spin-welding and is disclosed in such patents as U.S. Pat. No. 3,297,504, U.S. Pat. Reissue No. 29,448, and U.S. Pat. No. 3,499,068.

While the prior art method of spin-welding is advantageous over such methods as chemical bonding, cementing, and thermal bonding by means such as laser, electon beam, radio wave, and electrical means, it offers an disadvantage in that it is restricted to 20 cylindrical joints. Obviously two non-cylindrical container sections could not be successfully spin-welded because of their lack of surfaces which would maintain contact during relative rotary motion between them.

The present invention overcomes the disadvantage of rotary spin-welding by providing methods and apparatus for friction welding thermoplastic containers having non-cylindrical joinder sections as well as being applicable also to cylindrical sections. The present invention utilizes oscillatory motion, rather than rotary motion, between the two sections to be joined to provide the friction for generating the heat of bonding between the two sections.

DESCRIPTION OF THE PREFERRED EMBODIMENTS

The present invention is a modification and improvement over the apparatus disclosed in U.S. Pat. Nos. 3,499,068 and Re. 29,448, which patents are herein incorporated by reference in their entirety. For ease of description the present invention will be described with reference to only one station of a multi-station system such as the multi-station systems disclosed in the above-mentioned incorporated patents. Except for the modifications disclosed with respect to the single described station, the remainder of the container-forming system of this invention is substantially the same as that of the incorporated patents.

Figure 4:
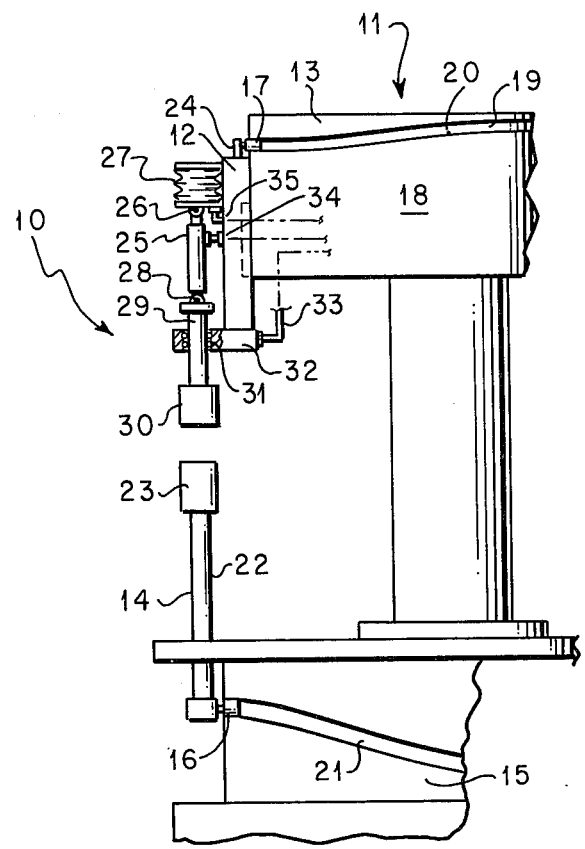
FIG. 4 is a partial side view of an oscillatory welding apparatus for low-frequency welding.

Referring now to FIG. 4, the single station 10 of the bonding system 11 is shown in side elevational view. The single station is typical of the other stations contained on the multiple station rotary system. The station comprises an upper carrier assembly 12 mounted by rollers and an upper cam head 13. The lower carrier assembly 14 is mounted in a lower cam assembly 15 by roller follower means 16. Upper assembly 12 is mounted in cam head 13 by roller follower 17.

Upper cam head 13 generally comprises a substantially circular vertical cam plate 18 having formed therein a peripheral cam groove 19. Cam groove 19 passes circumferentially around cam head 13 and is arranged to receive roller follower 17 in relatively close-fitting engagement therein. Cam channel 19 has vertical fluctuations such as shown at 20 for providing controlled vertical movement of carrier assembly 10 as it rotates about cam head 13.

Likewise lower cam assembly 15 contains a peripheral cam channel 21 encircling the generally circular shaped cam head 15 and arranged to receive cam follower 16 rotatably therein. Cam channel 21 likewise has vertical fluctuations for providing vertical movement of lower assembly 14 with respect to upper assembly 10.

Lower assembly 14 generally comprises a vertical spindle mount 22 to which is attached a lower tool 23 for receiving and tightly clamping the lower portion of the container to be bonded. Tool 23 preferably has an internal cavity facing upward shaped generally to conform to the shape of the lower container portion to be bonded. Futhermore, tool 23 has conventional means such as a vacuum system for selectively gripping the lower container portion therein.

Upper carrier head 12 is joined by shaft 24 to cam follower 17. Cam follower 17 is rotatably mounted on shaft 24. Also mounted on carrier head 12 is an air oscillator 25 acting through a pin joint 26 to an oscillatory diaphram 27 which in turn is fixedly attached to carrier head 12. Oscillator 25 has a slidable shaft 28 extending downwardly therefrom to which is connected an upper tool spindle 29 having an upper tool 30 attached thereto. Tool spindle 29 passes through air bearing 31 mounted in a bearing housing 32 which is fixedly attached to carrier head 12. Air bearing 31 allows slidable vertical movement between spindle 29 and carrier assembly 10. Upper tool 30 has conventional means such as vacuum means for tightly gripping the upper portion of the container to be joined to the lower portion held in tool 23. An air supply source 33 provides air to bearing 31, a second air supply source 34 provides air to oscillator 25, and a third air supply 35 provides air to diaphram 27. Oscillatory diaphram 27 is connected to oscillator 25 to provide amplitude adjustment of the oscillatory motion generated therein.

In typical operation, a pair of upper and lower container portions are denested from a stack thereof by a separate denesting assembly (not shown) and rotated through the various conveying systems associated with the aforementioned incorporated patented structures such that a bottom portion is secured within tool 23 and an upper portion held in upper tool 30. The movement of carrier 12 and carrier 14 around the circular cam heads 13 and 15 provides vertical movement between tools 23 and 30 bringing the container sections into close proximity. When the carrier assemblies 12 and 14, which traverse circularly around cam heads 13 and 15 as a single unit, have reached a predetermined point with respect to cam grooves 19 and 21, tools 23 and 30 will have moved into their closest position thus bringing the upper and lower container sections into conjoining relationship. Simultaneously with the joining of the upper and lower container sections, air is supplied via tube 34 to the air oscillator 25 thus providing a low frequency oscillation of the upper container held in tool 30 within the lower container clamped in tool 23 to sufficiently generate enough heat between the two container sections to provide an hermetic bonding therebetween. The number of oscillations necessary to provide bonding depend upon various parameters including the type of plastic utilized in the containers, as well as the container size and the frequency and amplitude of the oscillations. These will be known to the operator prior to adjusting the machinery, and the time and frequency of the oscillations will have been preset such that at the moment bonding is beginning, the oscillations will be terminated to allow the container sections to form a good bond. The air oscillator terminates oscillations in the lowermost position such that the container sections will be fully joined. Shortly after the oscillations have ceased and bonding, has been achieved, movement of the carrier assemblies 12 and 14 around cam heads 13 and 15 by means of the engagment of cam followers 16 and 17 in cam grooves 19 and 21 will move the carrier assemblies vertically apart and allow removal of the bonded container sections. These will then be transported via conventional means away from the bonding assembly.

Figure 5:
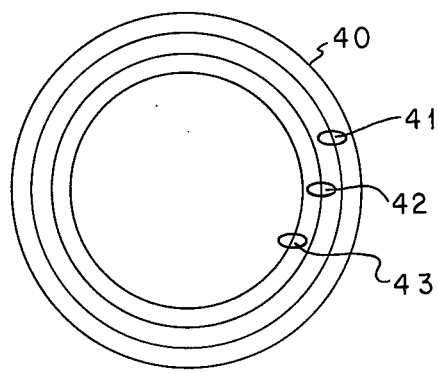
FIG. 5 is a schematic view of a rotary air joint for use with the apparatus of FIG. 4.

FIG. 5 is the schematic representation of the rotary air joint to which air supply tubes 33, 34, and 35 are connected. FIG. 5 illustrates the rotary joint 40 having an air supply outlet 41 to connect with diaphram supply tube 35, a second air supply port 42 connnectable to air oscillator supply tube 34, and a third air supply port 43 connectable to air bearings supply tube 33. As the carrier assemblies 12 and 14 are rotated about their respective cam heads 13 and 15, the air supply ports 41–43 communicate with the various supply tubes to supply a properly timed sufficient quantity of air into the various air actuated components of the assembly.

Figure 6:
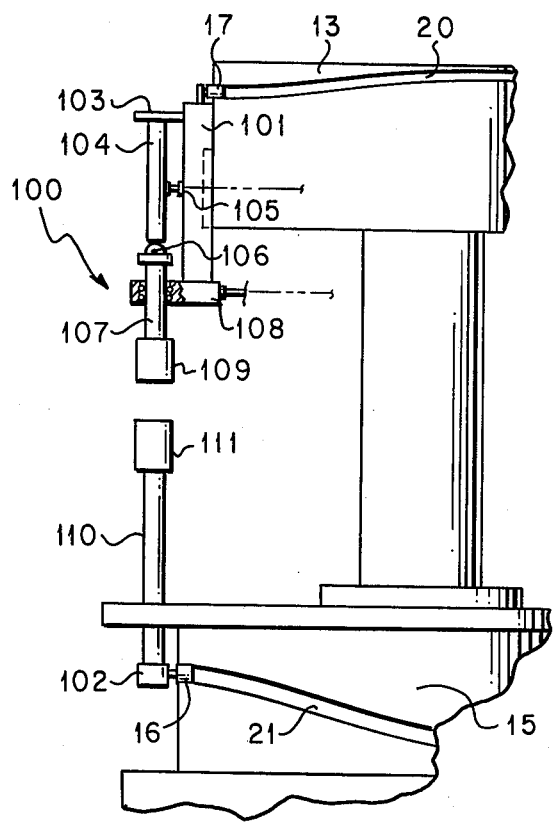
FIG. 6 is a partial side view of an oscillatory welding apparatus for high-frequency welding.

Referring now to FIG. 6, the second embodiment of the invention is disclosed, which embodiment is particularly useful for high frequency oscillatory bonding of container parts. In this embodiment the carrier assembly of the first embodiment has been replaced by a high frequency carrier assembly 100. This carrier assembly is mounted on similar cam heads 13 and 15 by roller followers 17 and 16. Assembly 100 comprises an upper carrier body 101 and a lower roller body 102. Upper tool body 101 has located thereon a mounting bracket 103 which mounts an ultrasonic transducer 104 lying in a vertical plane substantially parallel to cam plate 13. Transducer 104, which is electrically operated, is connected to a power source via electrical connection 105. At the lower end of transducer 104 is a pin connection 106 connecting an upper spindle 107 to the transducer. An air bearing 108 connected to body 101 supports spindle 107 in vertically slidable orientation. An upper container retention tool 109 is secured at the lower end of spindle 107. Retainer tool 109 preferably has an internal cavity formed in the general shape of the container top to be welded. The lower assembly 102 comprises a lower spindle 110 mounted on carrier block 102 and having a lower container retention tool 111 mounted at the top thereof. Tool 111 has an internal cavity similarly shaped to the lower portion of the plastic container to be welded. Tools 109 and 111 have conventional means for clamping tightly onto container sections.

In typical operation, the two carrier assemblies comprising a single station 100, will be rotated about their respective cam plates 13 and 15 with roller followers 17 and 16 engaged in cam grooves 20 and 21. This rotary movement and concurrent camming action around plates 13 and 15 by the station assembly results in a vertical movement of the upper and lower spindles toward and away from each other. At one point in this operation, while the upper and lower tools 109 and 111 are spaced apart, a plastic container top will be located in tool 109 and a plastic container bottom will be located in tool 111 by means conventional in the art. Additional movement of the cam followers in cam channels serves to translate the upper and lower spindles toward each other until the upper and lower plastic container sections are brought into mating contact. At this point in time the transducer will be supplied with electric power through lead 105 causing a very high frequency oscillation of the upper spindle 107 to occur, which in turn oscillates the upper plastic container with respect to the lower plastic container, setting up friction forces which result in a high heat generation and a subsequent welding of the upper and lower container sections together to form an hermetic seal. The continuous movement of the assembly around the cam plates then spreads the upper and lower spindles apart, allowing removal of the welded container unit from the upper and lower tools by known means.

Figure 7:
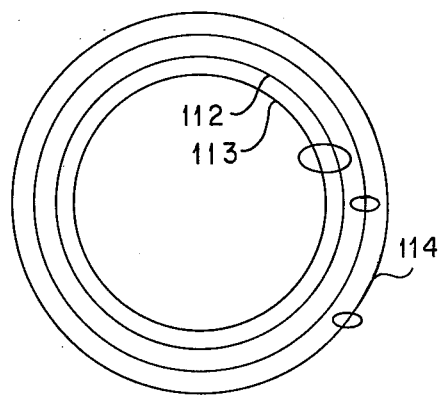
FIG. 7 is a schematic diagram of the rotary joint to provide air and electrical power to the apparatus of FIG. 6.

FIG. 7 is a schematic diagram of a rotary joint located near the central longitudinal axis of the total assembly. In FIG. 7 the circuits for the electrical supply are indicated at 112 and 113. An air supply is connected to a rotary air joint 114 to provide air to the bearing 108. In addition, conventional means such as vacuum or mechanical means can be provided in the tool holders 109 and 111 to secure the plastic containers therein during the oscillatory welding stage.

Figure 8:
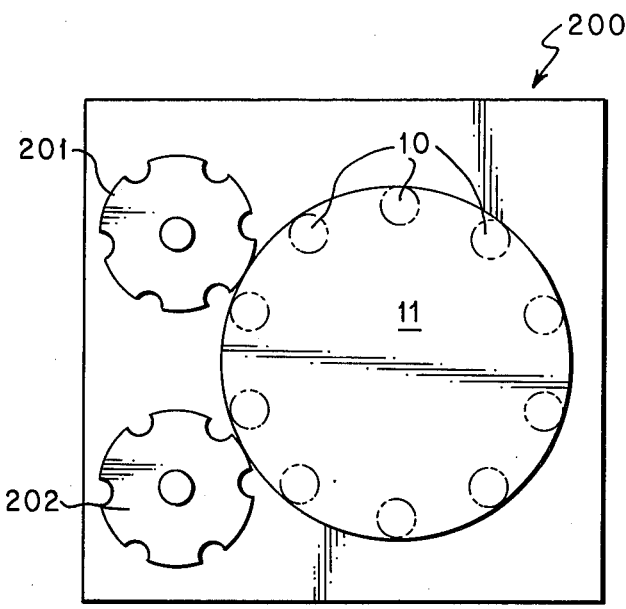
FIG. 8 is a schematic top view of the rotary infeed and exit system for the oscillatory welding apparatus.

FIG. 8 is a plan schematic view of a feed system 200 for the bonding assembly. The feed system comprises a rotary infeed such as starwheel 201, providing delivery of containers into the various stations 10, and the exit wheel 202 comprising a starwheel for removing the bonded containers after the welding process has been accomplished. The multi-station oscillatory welding system 11 is shown having ten individual welding stations 10 illustrated.

Figure 1:
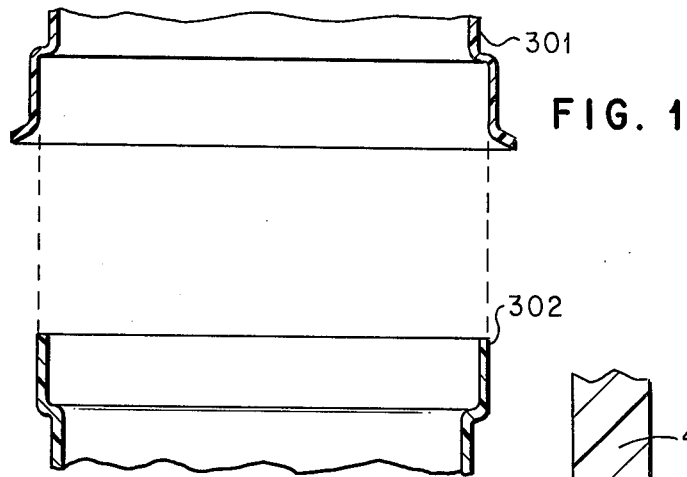
FIGS. 1–3 are cross-sectional side views of three different types of container joints which can be joined utilizing the present invention.
Figure 2:
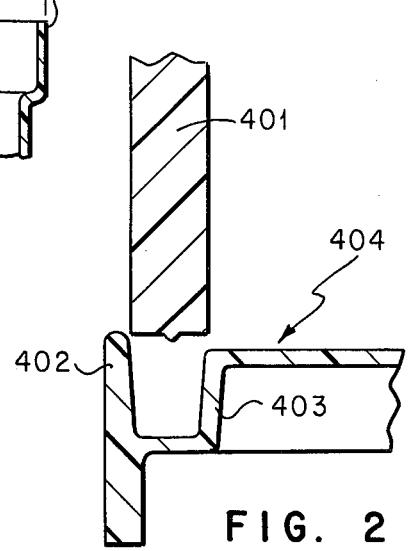
Figure 3:
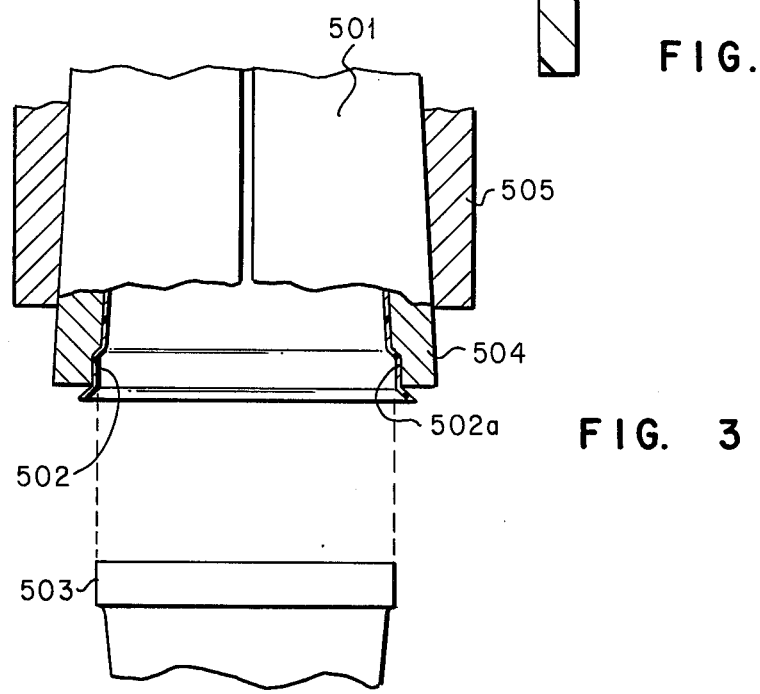

FIGS. 1–3 illustrate various joints that can be welded utilizing the present assembly and rigid plastic container sections. FIG. 1 illustrates a partial cross-sectional view of upper container 301 which is fused to a lower container section 302. This type of joint is normally referred to as a "compressive shear" joint. The outer diameter of the lower section 302 is a few thousandths inch larger than the inner diameter of the upper section 301. Section 301 is forced over section 302 to provide an air-tight fit and the oscillation between the two sections provides, through the heat of friction, a sufficient melting of the thermoplastic material to form a tight hermetic bond therebetween. FIG. 2 represents a partial cross-sectional side view of a fusion joint between two plastic articles, such as two sections of a container, or a container wall and a container bottom. This type of joint is generally referred to as an "energy director" joint. In this joint the side wall 401 of a container section is oscillated between upwardly extending flanges 402 and 403 of a plastic bottom section 404. The wall section 401 preferrably has a slight interference fit in between upper flanges 402 and 403 to provide sufficient friction heat to bond the bottom section to the wall 401.

FIG. 3 illustrates an alternate embodiment of the clamping function of the upper tool 501 of a container section 502. The container section 502 is to be friction welded to the lower container section 503. In this embodiment a wedge shaped clamp 504 connected to a first cam track located on upper cam plate 13 grips the container member 502. Member 504 is wedge shaped into a diverging orientation at the lower end and a slidable tightening ring 505 is located around the outer periphery of the wedge shaped clamping member. A second cam track located on the upper cam plate directs the vertical movement of clamping member 505 downward on wedge member 504 to provide an inward compression of container member 502. The timing of the first and second cam tracks on the upper cam member is such that member 505 is lowered on member 504 to compress container member 502 down upon container member 503 after container member 503 has just entered the barrel flange area 502a. Thereupon member 505 is moved downward to compress clamp 504 and container 502 into compression on container 503. After the downward clamping motion of outer member 505, oscillations are generated in the entire upper assembly to oscillate member 502 over 503 and provide sufficient heat of friction to bond the two container sections together.

Thus a welding system for friction welding plastic containers has been disclosed which is particularly advantageous for the joining of two thermoplastic container sections which are of a non-circular cross-sectional configuration. The present invention utilizes oscillatory axial motion as opposed to the conventional rotary motion of prior art spin-welders. The oscillatory motion being a translational motion rather than a rotating motion allows containers of almost any cross-sectional configuration to be friction welded together. The present invention discloses embodiments for low frequency oscillatory welding of plastic articles, and apparatus for high frequency oscillatory welding apparatus.

Although a specific embodiment of the present invention has been described in the detailed description above, the description is not intended to limit the invention to the particular forms or embodiments disclosed therein since they are to be recognized as illustrative rather than restrictive and it will be obvious to those skilled in the art that the invention is not so limited. For example, whereas electrical transducers and air operated oscillatory apparatus are disclosed for providing oscillatory welding action, it is clear that other means such as hydraulic action and mechanical oscillations could be utilized in their place. Also, whereas the top container portion is oscillated in contact with the bottom container section, it is possible to oscillate the bottom section instead, or to even oscillate both sections of the container.

The parameters which may be utilized for practicing various embodiments of the invention include selecting an oscillating frequency in the range of around 50 to about 50,000 cycles per second, with one particular preferred range being from about 120 to about 240 cycles per second. The polymers which can advantageously be welded by the present process include both amorphous and crystalline organic resins such as styrenes, polystyrenes, propylenes, polypropylenes, acrylonitriles, lexans, polyethylene, high density polyethylene, polyethylene terephthalate, and polyethylene terephthalate glycol. Thus the invention is declared to cover all changes and modifications of the specific examples of the invention herein disclosed for purposes of illustration which do not constitute departures from the spirit and scope of the invention.

The embodiments of the invention in which an exclusive property or privilege is claimed are defined as follows:

1. A method of welding at least two similarly configured thermoplastic sections together having relatively tight-fitting complementary joinder portions, said method comprising:
   sliding said tight-fitting portions together into telescopic conjoinment;
   oscillating said portions axially with respect to each other at a sufficiently rapid rate and for a sufficient period of time to generate enough heat to melt the areas of contact therebetween; and,
   bringing said sections into a final desirable position and allowing said heated areas to cool, thereby welding said sections together.

2. The method of claim 1 wherein said thermoplastic sections are sized to provide an interference fit therebetween.

3. The method of claim 1 or claim 2 wherein said thermoplastic sections are made from organic thermoplastic resins each having melt temperatures relatively close to the other.

4. The method of claim 1 or claim 2 wherein said thermoplastic sections are made from identical organic resins.

5. A method of forming a container from at least two thermoplastic sections each having a non-circular cross-sectional configuration which closely matches the other section, said method comprising:
   clamping said container sections into separate holder means providing axial telescopic alignment of the sections with each other;
   oscillating at least one of said holder means at a sufficiently rapid rate for a sufficient period of time, while maintaining said sections in telescoped arrangement, to generate enough heat to melt the contact areas therebetween;
   bringing said telescoped sections to a final preselected desirable position with respect to each other while still partially melted; and,
   allowing said heated areas to cool sufficiently to solidify said heated thermoplastic areas.

6. The method of claim 5 wherein at least one of said sections is an organic polymer selected from the group consisting of styrenes, polystyrenes, propylenes, polypropylenes, acrylonitriles, lexans, polyethylene, high density polyethylene, polyethylene terephthalate, and polyethylene terephthalate glycol.

7. The method of claim 5 or claim 6 wherein said thermoplastic sections are made of thermoplastic materials having melt temperatures within about 30° F. of each other.

8. The method of claim 5 or claim 6 wherein said oscillating step is performed at a frequency of from about 120 to about 240 cycles per second.

9. The method of claim 5 or claim 6 wherein said oscillating step is performed at a frequency of from about 20,000 to about 40,000 cycles per second.

10. The method of claim 5 or claim 6 wherein said oscillating step is performed at a frequency of from about 50 cycles per second to about 50,000 cycles per second.

11. The method of claim 5 wherein said thermoplastic sections are made from at least one amorphous organic resin.

12. The method of claim 5 wherein said thermoplastic sections are made from at least one crystalline organic resin.

* * * * *